May 27, 1930. F. J. CARNELLI 1,760,192
VISE
Filed Feb. 2, 1929

INVENTOR
F. J. Carnelli.
BY Wm H. Reid
ATTORNEY

Patented May 27, 1930

1,760,192

UNITED STATES PATENT OFFICE

FRANCIS J. CARNELLI, OF JAMAICA, NEW YORK

VISE

Application filed February 2, 1929. Serial No. 336,970.

This invention has reference to a machine tool or implement, generally known as a pipe vise, and has for its object to provide a structure in which a pipe or similar round article can be quickly and rigidly clamped between a jaw member and a binding member preferably in the form of a chain; and which structure provides means for very quickly producing the clamping action on the pipe, and which furthermore will provide a very rapid release of the clamping member, and with the expenditure of comparatively little power.

A further object of the invention is to provide in a device of this kind a toggle acting lever control, in connection with a quick form of initial adjustment, whereby the strong and rigid clamping action will take effect by the mere swinging of a handle lever; and wherein also the mere swinging back of this handle lever, with a small amount of force exerted, will at once release the pipe or other article.

In the accompanying drawing showing one embodiment of my invention,

Figure 1:
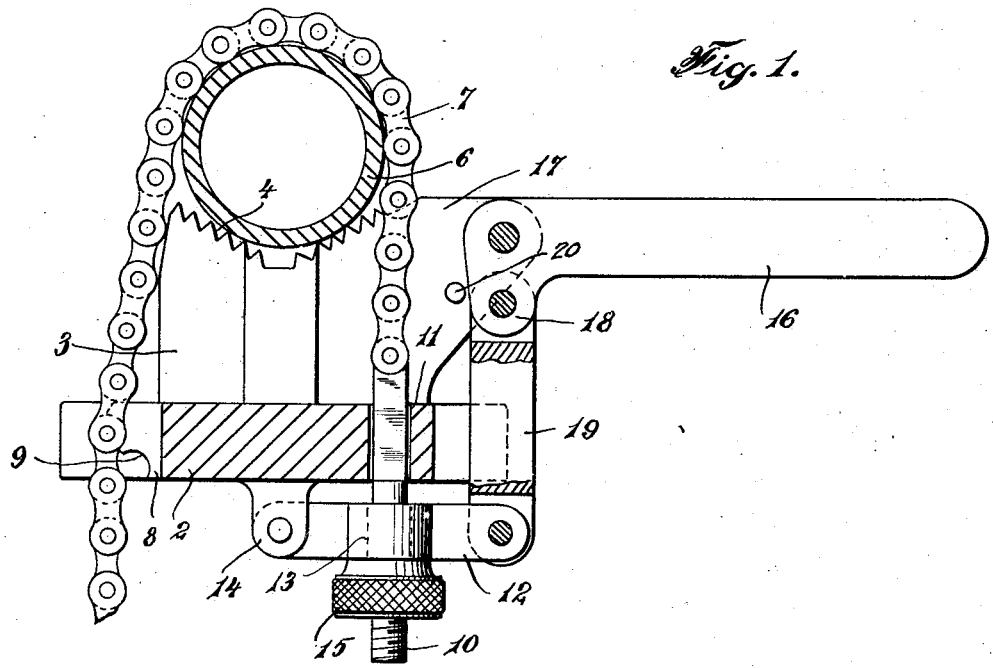
Figure 1 is a vertical section.
Figure 2:
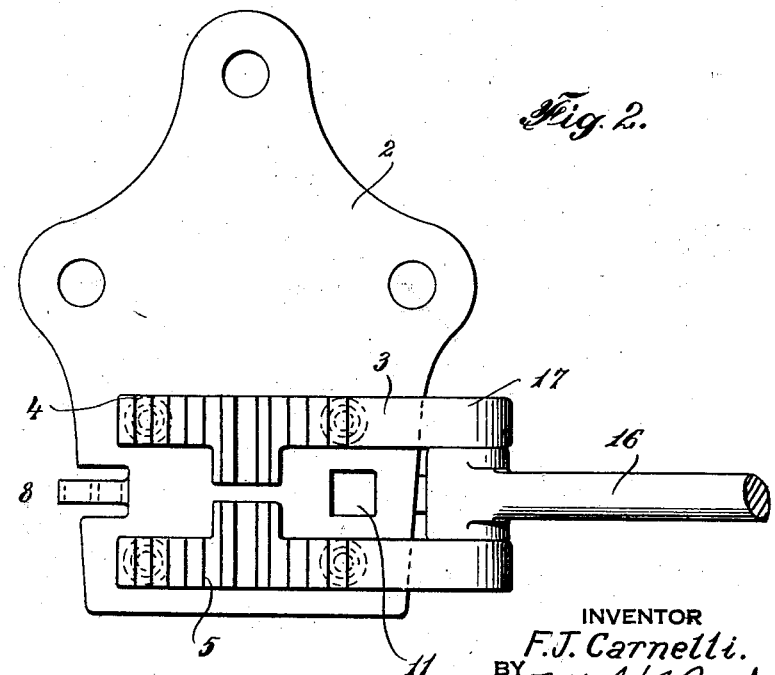
Fig. 2 is a horizontal section through the device.

As shown in the drawing, the device comprises a base 2 having apertured extensions for bolting to a suitable table or support, on which is secured the jaw member 3 having serrated angular portions 4 and 5 to receive the pipe 6 or other member of a rounded form.

The other clamping member to cooperate with the jaw is a chain 7, that has one end detachably and adjustably connected with the base 2. As shown a lug 8 projects outwardly with a kind of hook portion 9 adapted to enter the open links of the chain and hold it against upward movement of the chain as shown in Fig. 1. The chain is then passed around the pipe, and its other end is secured to a bolt 10. The latter is passed downward through an aperture 11 in the base as shown. On the base a lever 12 containing a slot 13, is hinged on an ear 14 projecting down from the base, and the bolt 10 extends through the opening 13 in the lever, and a nut 15 is applied to the projecting end of the bolt below the lever, to serve to draw the bolt down through this lever.

Means in the nature of a toggle link or leverage is provided that will serve to press the lever 12 downwardly, and a handle bar 16 is pivoted on a bracket 17 or extension of the jaw member at one side, which handle has an arm 18 projecting downwardly. A link 19 is pivoted to the arm 18, and also pivoted to the free end of the lever 12 as shown. It will be seen that when the handle is swung upward from the alining position of the link and the arm, it will swing the lever 12 upward. In this relative position of the parts the chain at its free end is disconnected from the lug 8, and the pipe is placed on the jaw member; and then the chain is passed around the pipe and hooked on the lug as shown. Thereupon the nut 15 is screwed up against the lever 12, to draw the bolt downward and pull the chain around the pipe and put a certain amount of tension on the chain. Then the handle 16 is swung downwardly and the toggle members will operate as the link straightens with the arm, to force the lever 12 downward under a very high pressure, and the toggle can be moved inward a short distance against a stop pin 20, that will be slightly beyond its dead center, so that it will be practically locked in this position. This will obviously serve to clamp the pipe by the chain against the jaw under great pressure. When it is desired to remove the pipe it is only necessary to swing the handle 16 upwardly, to break the toggle alinement and release the pressure on the lever 12. The pipe can now be removed; or the nut 15, now relieved of its strong pressure, can be easily turned down to at once loosen the chain, so that it can be disconnected from the lug 8 and the pipe removed.

It will be understood that a device of this character is comparatively simple in construction, and the small bolt and nut are only used for the initial clamping of the pipe, while the final binding action is effected by the swinging of a toggle lever; and reverse swing of the lever will at once loosen the pipe.

While I have described one embodiment of my invention, it can be altered in form, arrangement, relation and construction of parts, and modification can be made within the purview of the invention and within the scope of the claim, without departing from the spirit and import of the invention.

What I claim is:—

A pipe vise including a flat base plate, a pair of standards projecting upwardly from said base plate in spaced relation and having their top edges at their forward parts provided with synclinally arranged serrations, said serrations forming the fixed jaw of the vise, a pivot pin extending between the rear upper ends of said standards, a bell crank lever pivoted at its angle on said pin and having a long horizontal handle arm and a short vertical arm, lugs projecting downwardly from said base and alined with the centers of said jaws, a lever pivoted at one end between said lugs and having an enlarged central portion provided with a vertical opening, a link connecting the free end of the lever and the end of the short arm of the bell crank lever, said base having an opening alined above the opening in the second mentioned lever, said opening being disposed centrally between said standards, a chain engaging hook on the opposite side of the base from the opening and likewise disposed between said standards, a chain having its links selectively engageable on said hook and provided on its end with a bar having a portion passing through the opening in the base plate and substantially fitting the same and having a terminal threaded portion extending through the opening in the second mentioned lever, and an adjusting nut mounted on said threaded end and bearing against the underside of the second mentioned lever.

Signed at Queens Co., New York City, N. Y., on January 31st, 1929.

FRANCIS J. CARNELLI.